May 13, 1958
A. J. JOHNSON
2,834,634
PORTABLE IRRIGATION SYSTEM
Filed Oct. 24, 1955
2 Sheets-Sheet 1
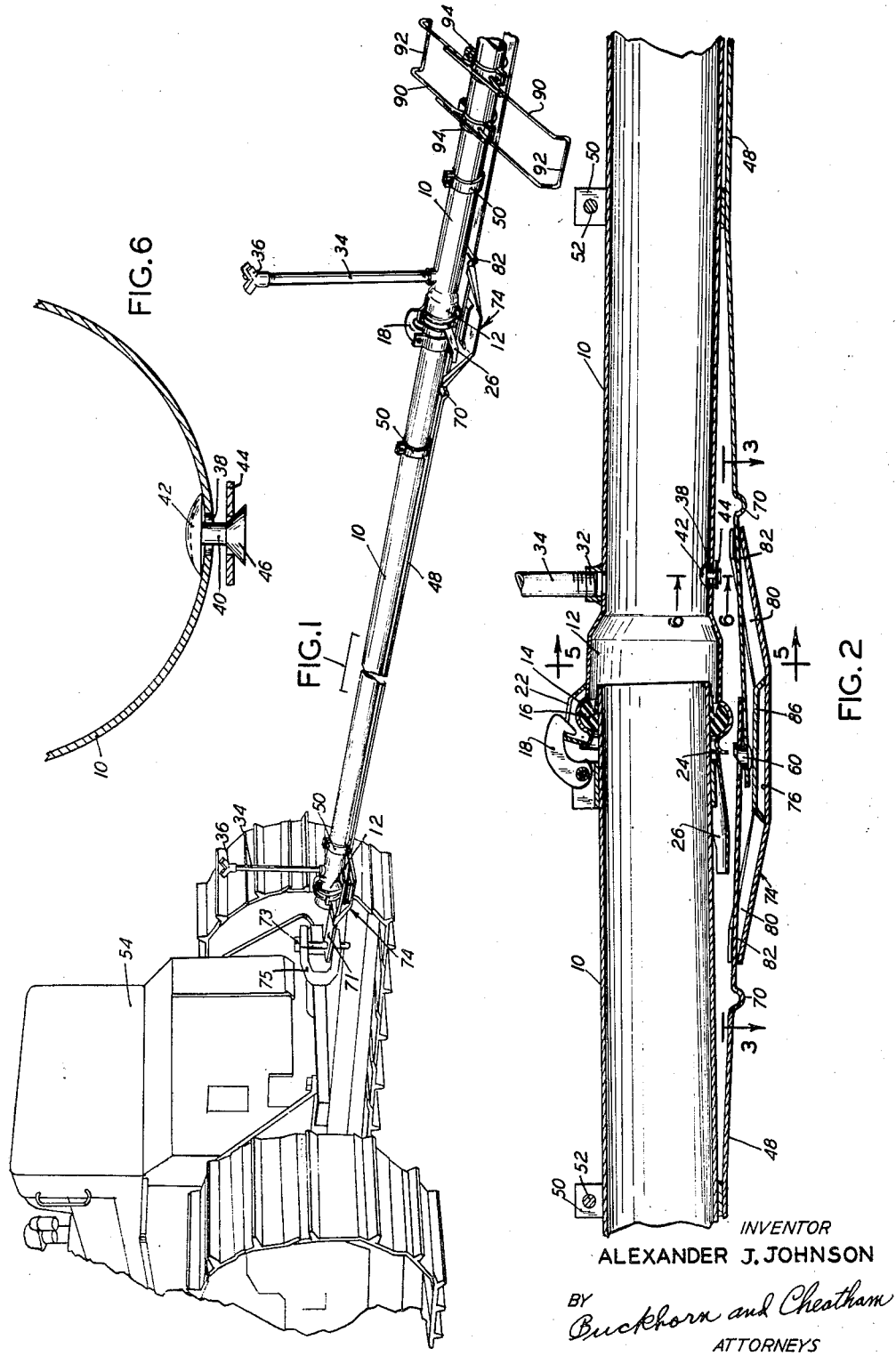
INVENTOR
ALEXANDER J. JOHNSON
BY Buckhorn and Cheatham
ATTORNEYS May 13, 1958
A. J. JOHNSON
2,834,634
PORTABLE IRRIGATION SYSTEM
Filed Oct. 24, 1955
2 Sheets-Sheet 2
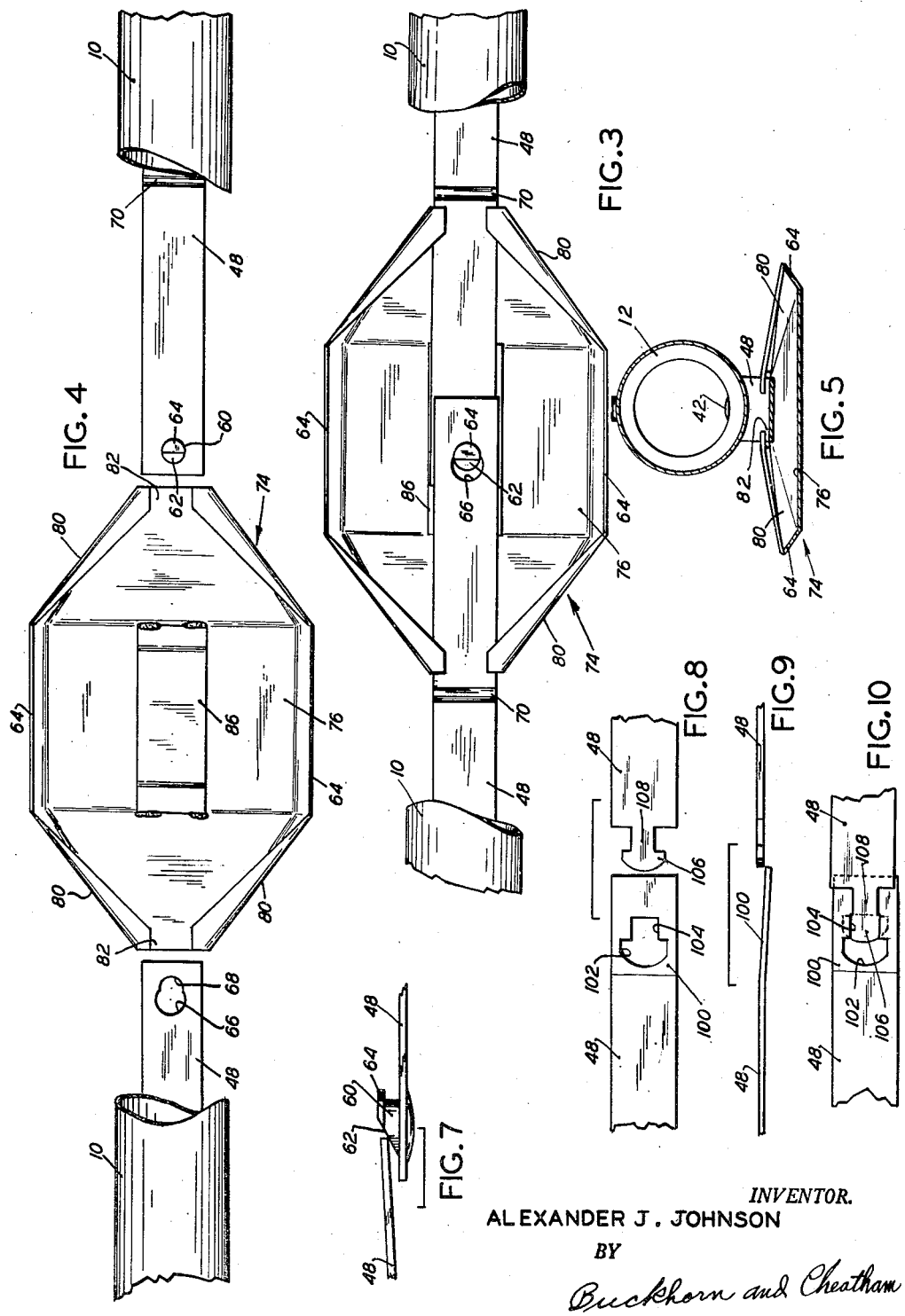
INVENTOR.
ALEXANDER J. JOHNSON
BY
Buckhorn and Cheatham
ATTORNEYS

United States Patent Office 2,834,634
Patented May 13, 1958

2,834,634

PORTABLE IRRIGATION SYSTEM

Alexander John Johnson, Eugene, Oreg., assignor, by mesne assignments, to R. H. Pierce Investment Co., a corporation of Oregon Application October 24, 1955, Serial No. 542,230

7 Claims. (Cl. 299—47)

The present invention relates to an irrigation system, and more particularly to a portable field sprinkling system.

The irrigation systems of the type with which the present invention is concerned comprise a series of pipe sections releasably connected together to form an elongate conduit, the length of which is determined by the number of pipe sections. Such pipe sections are ordinarily made of aluminum or thin steel and are of such length that each section can be picked up and carried by one man. Distribution of water from the conduit is effected by means of risers extending upwardly from the pipe sections.

While such an irrigation system can be moved from one place to another by disconnecting the individual pipe sections and carrying them individually to the new location and then assembling the conduit again, such procedure takes considerable time and, in many instances, it is possible and preferable to move the entire assembled conduit by dragging it endwise to the new location.

It is a principal object of the present invention to provide a new and improved draft arrangement for absorbing the strain involved during movement of the conduit as an entity so as not to impose any strain upon the couplings between the pipe sections.

A further object of the invention is to provide a new and improved arrangement for assuring that the pipe sections are coupled with the sprinkling risers in alignment and with the risers extending vertically from the ground. This is desired, of course, since the risers should extend vertically in order to obtain the most effective coverage of the ground during sprinkling.

In order to lighten the weight of the conduit for movement thereof, it is the practice to provide the conduit with drain valves which automatically drain the conduit upon release of the sprinkling pressure. It has been a fault of previous arrangements that the drainage spilled directly onto the ground and caused a washout of the soil. It is a further object of the present invention, therefore, to provide a conduit stabilizing means which is also effective to prevent washout of the soil during draining of a conduit.

Other objects and advantages of the invention will become more apparent hereinafter.

In accordance with an illustrated embodiment of the present invention, each of the pipe sections of an irrigating system is provided with a flat strap secured thereto extending lengthwise of the section along the bottom thereof. The straps are releasably connected together so as to transmit any traction force applied to the strap at one end of the conduit through the successive straps, thus to prevent the imposition of any strain from one conduit to another through the couplings between the conduits. To hold the pipe sections in alignment and support the same above the ground, a dished plate is provided beneath each of the pipe connections, the plate having means to engage the straps of the adjacent sections when they are in a predetermined position of alignment. Each of the pipe sections is also provided with a drain valve in one of the ends thereof for draining water onto the aforementioned plates which, being of substantial area, distribute the draining water without causing any washout of the soil beneath the conduit. For a more detailed description of the invention, reference is made to the accompanying drawings, wherein:

Fig. 1 is a fragmentary, perspective view of one end of an irrigation system incorporating the invention coupled to a tractor;

Fig. 2 is an enlarged, medial sectional view showing the connection between a pair of pipe sections;

Fig. 3 is a plan view of the coupled strap ends and stabilizing plate between a pair of pipe sections, the view being taken substantially along line 3—3 of Fig. 2;

Fig. 4 is a view similar to Fig. 3 but showing the parts in their disassembled condition;

Fig. 5 is a sectional view taken substantially along line 5—5 of Fig. 2;

Fig. 6 is an enlarged, sectional view taken substantially along line 6—6 of Fig. 2;

Fig. 7 is an enlarged, fragmentary view of the arrangement for connecting the strap ends as shown in Figs. 2, 3 and 4;

Fig. 8 is a plan view of the end portions of a pair of adjacent straps showing a modified arrangement for connecting the ends thereof together;

Fig. 9 is a view of a side elevation of the end portions shown in Fig. 8; and

Fig. 10 is a plan view showing the strap ends when connected together by the modified arrangement.

The invention is illustrated in connection with an irrigating system utilizing a plurality of pipe sections 10 which may be coupled together in any desired number. In the illustrated embodiment of the invention, each of the pipe sections utilized is formed with a bell 12 on one end thereof adapted to telescopically receive the plain end of an adjacent pipe section, as best shown in Fig. 2. Suitable means are provided to form a water tight union between the pipe sections, in this instance the bell 12 being formed with an outwardly extending, annular ridge 14 in which is seated a gasket 16 adapted to sealingly engage the end of the pipe section inserted within the bell 12. The pipe sections are releasably held together by means including a latch 18 pivotally supported on one of the pipes 10 and adapted to engage in a catch 22 mounted on the other pipe section.

The end bell 12 terminates in an outwardly flaring rim 24 to which is welded, along its lower half, a flaring scoop foot 26 which provides a guide to direct the end of a pipe section 10 into the bell 12, thus facilitating coupling of pipe sections by one man carrying a section of pipe near the middle of its length.

Each of the pipe sections 10 may be provided with one or more nipples 32 for receiving risers 34 which carry sprinkling heads 36 at their tops.

To drain the conduit of water after sprinkling has ceased and before attempting to move the conduit, suitable drain valves are provided. In accordance with the invention, a drain valve is located closely adjacent an end of each pipe section, though the particular construction of the valve is not important. In the illustrated embodiment of the invention, a pipe section is provided adjacent the bell 12 with an opening 38 in which is received the stem 40 of a rubber, mushroom shaped valve including an enlarged head 42, disposed within the conduit. When the pressure is relieved from the conduit, the valve assumes the bridging position shown in solid lines in Fig. 6, permitting water to drain under the head 42 and outwardly through the opening 38. When water is supplied under pressure to the conduit for sprinkling, the valve is deformed by the pressure to form a seal around the opening 38, as indicated by the dotted line position of the valve. To hold the valve in the opening 38, a washer 44 is provided about the stem 40 on the outside of the pipe section wall, the washer being held on the stem by an enlarged bottom end 46 of the stem which may be compressed so that the washer may be passed thereover when the valve is installed.

The draft and stabilizing means of the invention will now be described. Extending lengthwise of each pipe section 10, and lying horizontally and directly beneath the pipe section, that is on the side thereof opposite the riser 34, is a flat, steel strap 48. The straps 48 are secured to the pipe sections by suitable means such as split rings 50 welded to the straps and secured about the pipe sections by bolts 52. The straps 48 beneath intermediate pipe sections 10 of a conduit are of substantially the same length as the pipe sections but may be slightly longer so as to facilitate their overlapping, as best shown in Figs. 2 and 3 when the sections are assembled.

Referring now more specifically to Figs. 2, 3 and 4, the straps 48 of a conduit are provided with suitable interlocking means so that traction applied to a strap at one end of a line will be transmitted through all of the straps 48. Such means may comprise bayonet catch means on adjacent strap ends including a prong 60 extending upwardly from a strap 48 adjacent an end thereof. The prong 60 is preferably formed with a beveled surface 62 facing toward the adjacent end of the pipe section and with a lip 64 facing in the opposite direction. The opposite end of each strap is formed with a keyhole shaped opening for receiving the prong 60 of a strap connected thereto, the opening including an enlarged portion 66 through which the head of the prong 60 may be inserted during assembly of a pair of pipe sections and a neck portion 68 adapted cooperatively to receive the shank of the prong inserted therein when the irrigation line is completely assembled. Each of the straps 48 is also formed with a transverse ridge or abutment 70 spaced a short distance inwardly from each of its opposite ends for a purpose which will be explained.

To connect the straps 48 to a tractor 54 or other traction means, a short hitch strap 71 is provided having an opening at one end through which the hitch pin 73 of the tractor may be thrust to secure the hitch strap to the tractor hitch 75. The opposite end of the hitch strap 71 is formed cooperatively to connect with the connecting means on the end of the strap 48. So that the conduit may be moved in either direction, preferably one hitch strap is provided with a keyhole shaped opening 66, 68 for connection to the strap end at one end of the conduit while another hitch strap is provided having a prong 60 so that it may be connected to the end of the strap at the opposite end of the conduit.

Positioned beneath each of the couplings is a plate 74 which is preferably formed with a relatively flat, ground engaging, central portion 76. The plate 74 illustrated in the drawings is formed of a generally hexagonal sheet of metal of elongate shape and arranged with its longer axis extending parallel to the conduit. The plate is of sufficient length to extend beneath the drain opening 38 adjacent to the coupling and preferably is of substantial width so as to extend laterally of the conduit and provide a stable base for the same. The endwise converging side portions 80 of the plate are bent over upon the plate to define rectangular sleeves 82 in which the straps 48 are cooperatively and relatively snugly received. The opposite ends of the plate are also bent upwardly from the central portion 76 so that the sleeves 82 support the ends of the straps 48 in spaced relation above the ground. The opposite side edges 64 of the plate are also bent slightly upwardly so that the plate is slightly dished. A bridgelike element 86 is provided on the upper surface of the central portion of the plate and upon which the end of the lower strap 48 rests when a pair of pipe sections are coupled together, as shown in Fig. 2.

To assemble a pair of pipe sections 10 together, the sections are substantially aligned with one another and the plate 74 slipped onto the strap 48 of one of the sections. The strap 48 of the other section is then slipped through the sleeve 82 at the other end of the plate 74, and the pipe sections moved together to insert the one into the other, and at the same time the ends of the approaching straps have been maneuvered so that the strap end having the opening 66 formed therein slides up over the strap and over the prong 60, the beveled surface 62 facilitating this movement. The pipe sections are telescoped until the head of the prong slips through the opening 66 and thereafter the sections are drawn apart so as to engage the shank of the prong in the neck 68 of the opening of the uppermost strap. The latch 18 simultaneously engages the catch 22 so as to assist in holding the pipe sections 10 together. When the pipe sections are assembled, the bridge 86 of the plate 74 at each coupling will engage the under side of the lowermost strap 48 to prevent the same from springing out of engagement with the uppermost strap in the event that some force causes the pipe sections to telescope together and to place the strap opening 66 directly over the head of the prong engaged therein. The strap ridges 70 are positioned so as to be in close proximity to the opposite ends of a plate 74 when the pipe sections are assembled, thus to hold the plates in position beneath the couplings.

It will be observed that the plate 74 and the straps 48 act as guide elements to assure connection of the pipe sections with the risers thereof aligned and extending vertically.

To move an irrigation line, the tractor 54 or other traction equipment is connected to the hitch strap 71 at one end of the conduit. The pull by the tractor is transmitted through the straps 48 down through the line so that the burden of the strain is placed upon the straps and the connections therebetween and not upon the latching mechanism between the pipe sections. The upwardly tapering ends of the plates 74 facilitate their movement over the ground without catching in the ground or collecting dirt and other debris thereupon though, of course, it is inevitable that some dirt will be scraped into the plates. During movement of the irrigating line, the strap ridges 70 engage the edges of the plate sleeves 82 to hold the plates in position beneath the couplings.

Since the plates 74 extend beneath the drain openings 30, water draining from the openings will fall upon the plates and be distributed along the periphery of the same. The water spilling over the edge of the plates will not, of course, have the force of the water draining directly down out of the opening so that washing of the soil during draining of the conduit will be minimized.

In certain instances it may be desirable to provide the conduit with additional stabilizers to prevent tipping, and particularly where the conduit is to be moved over irregular terrain. For this purpose, stabilizing outriggers may be provided including a pair of U-shaped, wirelike arms 90 which extend laterally outwardly on opposite sides of the conduit and are formed with ground engaging runners 92 at the same level as the plates 74. The arms 90 are secured to the conduit by means of clamping bands 94. Such outriggers may be spaced along the conduit as it is deemed necessary. As will be seen, the runners 92 will engage the ground and help stabilize the conduit against tipping.

An alternative arrangement for connecting together the straps 48 is illustrated in Figs. 8 and 9. As indicated in those views, one of the straps may be formed with a slightly downwardly bent end portion 100 provided with a keyhole shaped opening including an enlarged portion 102 and a narrow portion 104 extending from the enlarged portion toward the adjacent end of the strap. The end of the strap 48 to be connected thereto is formed with a T-shaped projection complementary in shape to, but slightly smaller than, the opening 102, 104 and including a head 106 and a stem 108. To connect such straps, the straps are moved together and the head 106 of the projection on the one strap inserted through the enlarged opening 102 in the other strap. Pressure is then placed on the straps to deflect the projection downwardly through the opening, the straps at the same time being drawn apart whereby the head 106 will be engaged beneath the end portion 100, as shown in Fig. 10.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. An irrigation system comprising a plurality of pipe sections, means releasably coupling said sections end-to-end to form an elongate conduit, draft means for imparting longitudinal movement to said conduit comprising a plurality of elongate strap elements associated one with each of said sections, said strap elements being positioned horizontally and beneath said sections, and being of substantially the length of the associated section and extending end-to-end thereof, means securing each of said strap elements to its associated section, interengaging means on the ends of said strap elements releasably connecting the same together whereby endwise traction may be imparted to said conduit through said strap elements, each of said pipe sections having a drain valve closely adjacent an end thereof for draining the conduit, and a plurality of generally flat plates positioned horizontally and one beneath each of said coupling means and the corresponding, interengaged ends of the strap elements, said plates having a width substantially greater than that of said pipe sections and being of substantial length, whereby said plates stabilize said conduit laterally and distribute water draining from said drain valves to minimize washout of the soil therebeneath.

2. A system as set forth in claim 1 wherein the opposite ends of said plates are bent to form sleeves slidably receiving said strap elements whereby said plates may be quickly removed from or mounted on said elements upon dismantling or assembling of a conduit.

3. A system as set forth in claim 1 wherein said plate members are formed with upwardly turned ends to facilitate movement thereof over the ground.

4. An irrigation system comprising a plurality of pipe sections releasably coupled together to form an elongate conduit, draft means for imparting longitudinal movement to said conduit comprising a plurality of elongate strap elements disposed horizontally and end-to-end beneath said sections and secured thereto, interengaging means on the adjacent ends of said strap elements releasably connecting the same together whereby endwise movement may be imparted to said conduit through said strap elements, a plurality of dished plates disposed horizontally and one beneath each pair of connected ends of said strap elements, said strap elements and plates supporting the conduit in spaced relation above the ground, means securing said plates to said straps, and outrigger means on said conduit for preventing lateral tipping of the same.

5. An irrigation system including a pair of pipe sections releasably connected together, draft means for moving said pipe sections lengthwise including a pair of flat, horizontal straps secured one to each of said pipe sections on the under side thereof, means releasably connecting said straps together beneath the coupled ends of said pipe sections, and a ground engaging plate positioned beneath the connected ends of said straps to support the ends of the straps and pipe sections above the ground, said plate having upwardly turned forward and rearward ends formed to provide sleeves slidably receiving said straps one in each sleeve, whereby said plate may be mounted on said straps by inserting the straps one through each of said sleeves and sliding the pipe sections towards each other, and abutment means on each of said straps for engaging said plate and holding it in position beneath the ends of said straps.

6. In an irrigation system, including a pair of pipe sections releasably coupled together, draft means for moving said pipe sections including a pair of horizontally extending, straplike elements attached one to each of said sections on the under side thereof, coupling means adjacent the ends of said elements for releasably connecting the same together including an upwardly projecting prong on one of said elements, the other of said elements overlapping said one element and having an opening cooperatively receiving said prong, a dished plate positioned beneath the overlapped ends of said elements, the opposite ends of said plate being formed to provide sleeves slidably engaging said elements and supporting the same whereby said overlapped ends are spaced above the center of said member, and means on said plate projecting upwardly from the center thereof and engaging the under side of said one element to support the same and prevent accidental withdrawal of said prong from engagement in the opening in said other element.

7. In an irrigation system including a pair of cylindrical pipe sections releasably connected together to form an elongate conduit, each of said pipe sections having a sprinkling riser extending therefrom, said risers being aligned with one another, the improvement comprising means to guide the assembly of said pipe sections to attain alignment of said risers with one another including a pair of elongate, axially coincident straps of uniform cross section mounted horizontally beneath, and one on each of said pipe sections adjacent the coupled end thereof and extending in substantially axially parallel relation with the pipe section, and a rigid guide plate having a sleeve at each end of cross section complementary to said straps and slidably receiving said straps, whereby said pipe sections are guided into proper alignment with one another during assembly of said pipe sections when said straps are inserted in said guide plate sleeves.

References Cited in the file of this patent

UNITED STATES PATENTS

| 872,490 | Williamson | Dec. 3, 1902 |
| 2,741,509 | Melcher | Apr. 10, 1956 |
| 2,741,510 | McCulloch | Apr. 10, 1956 |